United States Patent
Inoue et al.

(10) Patent No.: US 10,071,370 B2
(45) Date of Patent: Sep. 11, 2018

(54) METHOD FOR REACTIVATING USED HYDROGENATION TREATMENT TITANIA CATALYST, AND REGENERATED HYDROGENATION TREATMENT TITANIA CATALYST

(71) Applicant: CHIYODA CORPORATION, Yokohama-shi, Kanagawa (JP)

(72) Inventors: Shinichi Inoue, Yokohama (JP); Yukitaka Wada, Yokohama (JP); Akihiro Muto, Yokohama (JP)

(73) Assignee: CHIYODA CORPORATION, Yokohama-Shi (JP)

( * ) Notice: Subject to any disclaimer, the term of this patent is extended or adjusted under 35 U.S.C. 154(b) by 0 days.

(21) Appl. No.: 14/411,083

(22) PCT Filed: May 16, 2013

(86) PCT No.: PCT/JP2013/063706
§ 371 (c)(1),
(2) Date: Dec. 23, 2014

(87) PCT Pub. No.: WO2014/013784
PCT Pub. Date: Jan. 23, 2014

(65) Prior Publication Data
US 2015/0202614 A1    Jul. 23, 2015

(30) Foreign Application Priority Data

Jul. 19, 2012    (JP) ................. 2012-160924

(51) Int. Cl.
| | | |
|---|---|---|
| *B01J 38/52* | (2006.01) | |
| *B01J 38/12* | (2006.01) | |
| *B01J 27/19* | (2006.01) | |
| *B01J 27/28* | (2006.01) | |
| *C10G 45/04* | (2006.01) | |
| *B01J 38/02* | (2006.01) | |
| *B01J 38/50* | (2006.01) | |
| *B01J 23/882* | (2006.01) | |
| *B01J 21/04* | (2006.01) | |
| *B01J 21/06* | (2006.01) | |
| *B01J 21/20* | (2006.01) | |
| *B01J 31/38* | (2006.01) | |

(Continued)

(52) U.S. Cl.
CPC ............... *B01J 38/52* (2013.01); *B01J 21/04* (2013.01); *B01J 21/063* (2013.01); *B01J 21/20* (2013.01); *B01J 23/882* (2013.01); *B01J 27/19* (2013.01); *B01J 27/28* (2013.01); *B01J 27/285* (2013.01); *B01J 31/38* (2013.01); *B01J 31/4053* (2013.01); *B01J 38/02* (2013.01); *B01J 38/12* (2013.01); *B01J 38/50* (2013.01); *C10G 45/04* (2013.01); *B01J 38/48* (2013.01); *C10G 2300/708* (2013.01)

(58) Field of Classification Search
CPC ... B01J 38/52; B01J 38/12; B01J 38/68; B01J 38/02; B01J 38/50; B01J 38/48; B01J 27/285; B01J 27/19; B01J 27/28; B01J 21/063; B01J 21/20; B01J 21/04; B01J 31/38; B01J 31/4053; B01J 23/882; C10G 45/08; C10G 45/04; C10G 2300/708
USPC .............................................. 502/20–56, 172
See application file for complete search history.

(56) References Cited

U.S. PATENT DOCUMENTS

| | | |
|---|---|---|
| 5,468,709 A | 11/1995 | Yamguchi et al. |
| 6,821,412 B1 | 11/2004 | Fujukawa et al. |
| 2002/0010086 A1 | 1/2002 | Plantenga et al. |

(Continued)

FOREIGN PATENT DOCUMENTS

| | | |
|---|---|---|
| JP | 5-96161 A | 4/1993 |
| JP | 5-184921 A | 7/1993 |

(Continued)

OTHER PUBLICATIONS

Luo et al., "Titania-Alumina Composites," Mat. Res. Soc. Symp. Proc. (1994), vol. 346, pp. 445-450.

(Continued)

*Primary Examiner* — Jennifer A Smith
(74) *Attorney, Agent, or Firm* — Birch, Stewart, Kolasch & Birch, LLP

(57) ABSTRACT

Provided is a method of reactivating a used titania catalyst for hydrogenation treatment, capable of improving the catalytic activity of the used titania catalyst for hydrogenation treatment that is obtained by supporting a catalyst component on a titania support and exhibits reduced catalytic activity after having been used for hydrogenation treatment of a hydrocarbon oil, to a level comparable to that of a newly prepared fresh titania catalyst before use. The method of reactivating a used titania catalyst for hydrogenation treatment, the used titania catalyst for hydrogenation treatment being obtained by supporting a catalyst component on a titania support and exhibiting reduced catalytic activity after having been used for hydrogenation treatment of a hydrocarbon oil, includes: a coke removal step of removing a carbonaceous component on a surface of the used catalyst by heating the catalyst in an oxygen-containing gas atmosphere; an impregnation step of impregnating the carbonaceous component-removed catalyst obtained by the coke removal step with a saccharide-containing solution; and a drying step of drying the saccharide-impregnated catalyst obtained by the impregnation step, to obtain a catalyst in which a saccharide is supported.

8 Claims, No Drawings

(51) Int. Cl.
*B01J 31/40* (2006.01)
*B01J 38/48* (2006.01)

(56) References Cited

U.S. PATENT DOCUMENTS

| | | | |
|---|---|---|---|
| 2003/0104926 A1* | 6/2003 | Eijsbouts | B01J 31/0202 |
| | | | 502/29 |
| 2004/0176620 A1* | 9/2004 | Kuperman | B01J 23/52 |
| | | | 549/533 |
| 2009/0258779 A1 | 10/2009 | McCarthy et al. | |
| 2009/0258780 A1 | 10/2009 | Toba et al. | |
| 2011/0094939 A1 | 4/2011 | Jansen et al. | |
| 2012/0190541 A1* | 7/2012 | Koranne | B01J 21/063 |
| | | | 502/439 |
| 2012/0318717 A1 | 12/2012 | Inoue et al. | |
| 2015/0202614 A1* | 7/2015 | Inoue | B01J 38/12 |
| | | | 502/33 |

FOREIGN PATENT DOCUMENTS

| | | |
|---|---|---|
| JP | 6-106061 A | 4/1994 |
| JP | 6-226108 A | 8/1994 |
| JP | 2001-276626 A | 10/2001 |
| JP | 2002-28485 A | 1/2002 |
| JP | 2002-85975 A | 3/2002 |
| JP | 2004-33819 A | 2/2004 |
| JP | 2006-61845 A | 3/2006 |
| JP | 2007-507334 A | 3/2007 |
| JP | 2009-160498 A | 7/2009 |
| JP | 2011-516259 A | 5/2011 |
| JP | 4748497 B2 | 5/2011 |
| JP | 2011-206695 A | 10/2011 |
| WO | WO 95/31280 A1 | 11/1995 |
| WO | WO 96/41848 A1 | 12/1996 |
| WO | WO 01/15805 A1 | 3/2001 |
| WO | WO 2009126278 A2 * | 10/2009 ............ B01J 23/85 |

OTHER PUBLICATIONS

International Search Report for PCT/JP2013/063706 dated Jul. 23, 2013.

English translations of the International Preliminary Report on Patentability and Written Opinion of the International Searching Authority (Forms PCT/IB/338, PCT/IB/373 and PCT/ISA/237), dated Jan. 29, 2015, for counterpart International Application No. PCT/JP2013/063706.

Extended European Search Report dated Mar. 15, 2016, in European Patent Application No. 13819518.5.

* cited by examiner

METHOD FOR REACTIVATING USED HYDROGENATION TREATMENT TITANIA CATALYST, AND REGENERATED HYDROGENATION TREATMENT TITANIA CATALYST

TECHNICAL FIELD

The present invention relates to a method of reactivating a used titania catalyst for hydrogenation treatment for reactivating a titania catalyst for hydrogenation treatment after use, exhibiting reduced catalytic activity after having been used for hydrogenation treatment of a hydrocarbon oil, and to a regenerated titania catalyst for hydrogenation treatment, which is reactivated by the method.

BACKGROUND ART

When fossil fuels such as petroleum or coal are combusted, sulfur oxides (SOx), nitrogen oxides (NOx), and particulates such as sulfates, soot (carbon; graphite), or soluble organic fractions (SOF) derived from a sulfur content in the fossil fuel are generated and emitted to the atmosphere together with an exhaust gas. For example, the sulfur oxides have significant adverse effects on the global environment, such as causing acid rain or the like, destroying a nature environment such as a forest or a lake, and having a large impact on the ecosystem.

In such circumstances, for example in the automobile industry, technologies for exhaust gas control have been vigorously developed, such as a combination of high-pressure injection and exhaust gas recirculation (EGR), homogeneous charge intelligent multiple injection, a novel NOx catalyst. In addition, in the petroleum refining industry, there is a need to further reduce a concentration of the sulfur content in gasoline or gas oil with a view to applying the EGR effective for reducing NOx and reducing an impact on an after-treatment apparatus for removing the particulates.

From such viewpoints, a regulation particularly on the sulfur content in a petroleum fraction (hydrocarbon oil) such as gasoline, kerosene or gas oil, or heavy oil has been tightened, and a catalyst for hydrogenation treatment having excellent desulfurization activity enabling more efficient removal of the sulfur content in a hydrocarbon oil has been developed.

As a catalyst for hydrogenation treatment industrially currently used for removing sulfur in apetroleum fraction, a catalyst obtained by supporting a periodic table group VI metal such as molybdenum and tungsten and a periodic table group VIII to X metal such as cobalt and nickel on a porous alumina support is typical. As a catalyst having additionally excellent desulfurization activity, a hydrodesulfurization catalyst using a porous titania support has been known.

However, in fact, such catalyst is hardly industrially used as the catalyst for hydrogenation treatment for the purpose of removing the sulfur content in a hydrocarbon oil, so-called desulfurization, because titania has shortcomings such as a small specific surface area, poor formability, and low mechanical strength as compared to alumina, and further, is economically disadvantageous owing to its higher raw material cost as compared to alumina.

In view of the foregoing, various studies have hitherto been made for overcoming such shortcomings of the titania support.

For example, in Patent Literature 1, there is obtained a high-performance hydrodesulfurization catalyst having excellent thermal stability, a large specific surface area, high dispersion of a catalyst metal, improved catalytic activity, and high mechanical strength, by adding as a particle growth inhibitor an anion and a cation to a hydrosol or hydrogel of a hydrous oxide of titanium produced by a pH swing method, or a dried substance thereof, followed by drying and calcination.

In addition, for the purpose of obtaining a catalyst excellent in economic efficiency as well as desulfurization activity and mechanical strength, there has been made an attempt to make a composite of alumina having a low raw material cost and titania promising high performance. In Patent Literature 2, there is proposed a technology of a method of producing a catalyst support for hydrorefining treatment, involving co-precipitating an aluminum ion and a titanium ion to make a composite. In addition, in Patent Literature 3, there is proposed a method of producing an alumina-titania composite catalyst support, involving adding a titanium hydroxycarboxylate and/or a sol of titanium oxide or titanium hydroxide and a hydroxycarboxylic acid to aluminum oxide and/or aluminum hydroxide, followed by mixing and kneading, and calcination. Further, in Patent Literature 4, there is proposed a method of apparently converting a pore surface of an alumina support to titania, involving introducing a titanium tetrachloride gas to the alumina support to perform chemical vapor deposition of titanium on a surface of alumina. Further, in Patent Literature 5, there is proposed a technology of coating a pore surface of alumina with titanium, involving impregnating an alumina support with a solution containing titanium, followed by drying.

Further, for example in Non Patent Literature 1, there is disclosed a method of obtaining a titania-alumina support, involving precipitating (coating) titanium hydroxide on a surface of alumina hydrate particles, followed by aging, filtration, washing, forming, and calcination. In addition, the inventors of the present invention have proposed a catalyst production technology capable of producing a catalyst having a large specific surface area and high mechanical strength, and exhibiting activity as the hydrodesulfurization catalyst comparable to that of the hydrodesulfurization titania catalyst, even when 13 mass % or more of titanium oxide is supported, involving supporting titanium oxide on a surface of an inorganic oxide through precipitation and lamination of titanium oxide between an isoelectric point of the inorganic oxide and an isoelectric point of the titanium oxide, to chemically and macroscopically integrate the inorganic oxide and the titanium oxide (Patent Literature 6).

Further, in Patent Literature 7, there is disclosed a method of producing a catalyst for hydrogenation treatment, involving impregnating an alumina support with a catalyst component-containing aqueous solution containing a catalyst metal, phosphoric acid, and an additive selected from a dihydric or trihydric alcohol having 2 to 10 carbon atoms in one molecule, an ether thereof, a monosaccharide, a disaccharide, and a polysaccharide, followed by drying at 200° C. or less. In addition, in Patent Literature 8, there is proposed a method involving adding a water-soluble organic compound having a molecular weight of 100 or more and having a hydroxyl group and/or an ether bond, such as a diol, an alcohol, an ether group-containing water-soluble polymer, a saccharide, and a polysaccharide, to a catalyst component-containing aqueous solution, in production of a catalyst for hydrogenation treatment by supporting a catalyst metal on a support obtained by supporting an aqueous solution containing a titanium compound on an alumina hydrogel and then performing calcination. Further, the inventors have proposed a method of obtaining a titania catalyst for hydrogenation treatment, involving coating a surface of alumina hydrate particles with titanium hydroxide particles, followed by forming and then drying, and impregnating an obtained titania-coated alumina support with a catalyst component-containing aqueous solution containing a catalyst metal compound and a saccharide, followed by drying (Patent Literature 9).

Although those titania catalysts for hydrogenation treatment using titania supports exploit excellent features of a titania support and overcome the shortcomings to some extent, the problem of being particularly economically disadvantageous from an industrial viewpoint has not yet been overcome.

Meanwhile, for the catalyst for hydrogenation treatment, there has been made an attempt to reactivate a used catalyst that has been used for hydrogenation treatment of a hydrocarbon oil and thus has reduced catalytic activity and utilize the catalyst as a regenerated catalyst.

For example, in association with a catalyst for hydrogenation treatment obtained by supporting a catalyst metal on an inorganic oxide support containing alumina and titania, there is disclosed, in Patent Literature 10, using, in a second desulfurization step, a regenerated catalyst regenerated through a precipitated coke removal reaction under the conditions of an air partial pressure of from 0.05 to 5 MPa and a temperature of from 200 to 800° C., in the case of conducting hydrogenation treatment of gas oil by two steps of a first desulfurization step and the second desulfurization step. In addition, in association with the above-mentioned catalyst for hydrogenation treatment, there is disclosed, in Patent Literature 11, regenerating a used catalyst through calcination treatment at 300° C. for 1 hour in a nitrogen atmosphere, followed by calcination treatment at 450° C. for 3 hours in a mixed gas atmosphere of 50% nitrogen gas and 50% air.

Further, in association with a catalyst for hydrogenation treatment obtained by supporting a catalyst metal such as molybdenum, cobalt, nickel, and phosphorus on an alumina support containing in the catalyst an organic additive such as diethylene glycol, citric acid, and polyethylene glycol, there is disclosed, in Patent Literature 12, performing stripping treatment at from 100 to 370° C. in the presence of an oxygen-containing gas, and then, performing regeneration treatment at from 300 to 500° C. in the presence of an oxygen-containing gas. In addition, in association with the above-mentioned catalyst for hydrogenation treatment, there is disclosed, in Patent Literature 13, activating a used catalyst through regeneration treatment at from 300 to 650° C. in the presence of an oxygen-containing gas after stripping treatment of hydrocarbon, followed by impregnation with "a solution containing an acid and an organic additive" such as: citric acid and polyethylene glycol; or phosphoric acid and polyethylene glycol, and then drying.

CITATION LIST

Patent Literature

[PTL 1] JP 2002-028485 A
[PTL 2] JP 05-096161 A
[PTL 3] JP 05-184921 A
[PTL 4] JP 06-106061 A
[PTL 5] JP 2001-276626 A
[PTL 6] JP 2004-033819 A
[PTL 7] JP 06-226108 A
[PTL 8] JP 2002-085975 A
[PTL 9] JP 2011-206695 A
[PTL 10] WO 01/015805 A1
[PTL 11] JP 2006-061845 A
[PTL 12] JP 4748497 B2
[PTL 13] JP 2007-507334 A

Non Patent Literature

[NPL 1] Mat. Res. Soc. Symp. Proc. Vol. 346 445-450 1994

SUMMARY OF INVENTION

Technical Problem

In view of the forgoing, the inventors of the present invention have made extensive studies on reactivating a used titania catalyst for hydrogenation treatment exhibiting reduced catalytic activity after having been used for hydrogenation treatment of a hydrocarbon oil to improve its catalytic activity to a level comparable to that of a fresh titania catalyst before use and using the catalyst as a regenerated titania catalyst for hydrogenation treatment.

The inventors of the present invention have tried regenerating the titania catalyst for hydrogenation treatment after use through coke removal treatment for removing a carbonaceous component on the surface of the catalyst by heating the catalyst at 500° C. in an oxygen-containing gas atmosphere, but this results in the finding that the catalytic activity (desulfurization activity) of the obtained regenerated titania catalyst is still less than 60% of that of a newly prepared fresh titania catalyst and it is difficult to reactivate the catalyst to the extent that the catalyst can be reused only through the coke removal treatment.

In such circumstances, the inventors have further tried reactivating the regenerated titania catalyst after the coke removal treatment through impregnation with the "solution containing an acid and an organic additive," followed by drying, in conformity to the activation method disclosed in Patent Literature 13 (Comparative Example 2 described later). However, also in this case, the catalytic activity (desulfurization activity) of the obtained regenerated titania catalyst is still less than 65% of that of a fresh titania catalyst before use, and it is difficult to reactivate the catalyst to the extent that the catalyst can be reused. The cause of such result is not clearly revealed, but the inventors consider the cause as described below.

The titania support and the alumina support seem to have the following difference. Specifically, in the case of alumina, its zeta potential hardly changes in a weakly acidic region of from pH 3 to 7. Therefore, in the case of an alumina catalyst, the interaction between the support and molybdenum serving as a catalyst metal is not affected even when a weak acid is added as an activation substance for regeneration. In contrast, in the case of titania, its zeta potential changes drastically from a minus side to a plus side in such pH region. Therefore, in the case of a titania catalyst, the interaction between the support and anionic molybdenum oxide is likely to be increased when an acid is added. It is pointed out that molybdenum exhibiting a strong interaction with a support is generally hardly sulfurized, and hence has low desulfurization reactivity. Accordingly, it seems that, when an acid is added to the titania catalyst as an activation substance for regeneration, the desulfurization activity is affected, and hence an effect of reactivating the catalyst is not obtained.

In this context, the inventors have made further studies on reactivating the titania catalyst for hydrogenation treatment after use. As a result, the inventors have found a surprising fact that the catalytic activity (desulfurization activity) of the regenerated titania catalyst can be improved to a level comparable to that of a newly prepared fresh titania catalyst by impregnating a carbonaceous component-removed catalyst obtained through the coke removal treatment with a saccharide-containing solution containing a saccharide, and drying the obtained saccharide-impregnated catalyst, to allow the saccharide to be supported. Thus, the present invention has been completed.

Accordingly, an object of the present invention is to provide a method of reactivating a used titania catalyst for hydrogenation treatment, capable of improving the catalytic activity of the used titania catalyst for hydrogenation treatment that is obtained by supporting a catalyst component on a titania support and exhibits reduced catalytic activity after having been used for hydrogenation treatment of a hydrocarbon oil, to a level comparable to that of a newly prepared fresh titania catalyst before use.

In addition, another object of the present invention is to provide a regenerated titania catalyst for hydrogenation treatment, which is regenerated by the method of reactivating a used titania catalyst for hydrogenation treatment and exhibits catalytic activity comparable to that of a fresh titania catalyst before use.

Solution to Problem

That is, according to one embodiment of the present invention, there is provided a method of reactivating a used titania catalyst for hydrogenation treatment, the used titania catalyst for hydrogenation treatment being obtained by supporting a catalyst component on a titania support and exhibiting reduced catalytic activity after having been used for hydrogenation treatment of a hydrocarbon oil, the method including: a coke removal step of removing a carbonaceous component on a surface of the used catalyst by heating the catalyst in an oxygen-containing gas atmosphere; an impregnation step of impregnating the carbonaceous component-removed catalyst obtained by the coke removal step with a saccharide-containing solution; and a drying step of drying the saccharide-impregnated catalyst obtained by the impregnation step to obtain a catalyst in which a saccharide is supported.

According to another embodiment of the present invention, there is provided a regenerated titania catalyst for hydrogenation treatment, which is obtained by the method of reactivating a used titania catalyst for hydrogenation treatment described above.

In the present invention, the catalyst for hydrogenation treatment to be reactivated is a titania catalyst for hydrogenation treatment after use that is obtained by supporting a catalyst component on a titania support and exhibits reduced catalytic activity after having been used for hydrogenation treatment of a hydrocarbon oil.

Herein, as the titania support, a titania support having a large specific surface area and high thermal stability as compared to the related-art titania is preferred. For example, there may be given any known titania supports such as the titania disclosed in Patent Literature 1. From the viewpoints of catalyst strength and catalyst production cost, more preferred are the titania-coated alumina supports including a titania coating layer on the surface of alumina disclosed in Patent Literatures 4, 6, and 9, not just a mixture of alumina and titania.

In addition, the catalyst component to be supported on the titania support generally includes at least one kind of periodic table group VI metal compound, at least one kind of periodic table group VIII to X metal compound, and at least one kind of phosphorus compound. Herein, as preferred periodic table group VI metals, there are given molybdenum and tungsten. In particular, molybdenum is preferred. In addition, as preferred molybdenum compounds, there are given molybdenum trioxide, molybdic acid, ammonium molybdophosphate, and ammonium paramolybdate. In addition, as periodic table group VIII to X metals, there are given cobalt and nickel. As preferred nickel compounds, there are given, for example, nickel nitrate, nickel sulfate, nickel acetate, nickel carbonate, nickel chloride, nickel hydroxide, and basic nickel carbonate. In addition, as preferred cobalt compounds, there are given, for example, cobalt nitrate, cobalt sulfate, cobalt acetate, basic cobalt carbonate, cobalt carbonate, cobalt chloride, and cobalt hydroxide. Any one kind of those cobalt compounds and nickel compounds may be used alone, or two or more kinds thereof may be used in combination. Further, preferred examples of the phosphorus compound include phosphorus pentaoxide, diammonium hydrogen phosphate, ammonium dihydrogen phosphate, disodium hydrogen phosphate, sodium dihydrogen phosphate, and orthophosphoric acid.

In the present invention, the newly prepared fresh titania catalyst for hydrogenation treatment before use may be a catalyst obtained by impregnating the titania support with a catalyst component-containing solution containing, in addition to the catalyst component, any organic additive heretofore known contributing to catalytic activity, and then performing drying. Examples of the organic additive to be used for this purpose include organic acids, aliphatic dialcohols, ethers and polyethers, saccharides, and nitrogen-containing compounds.

In the present invention, the titania catalyst after use exhibiting reduced catalytic activity after having been used for hydrogenation treatment of a hydrocarbon oil refers to a used titania catalyst for hydrogenation treatment that has been used for hydrogenation treatment (desulfurization treatment) of an petroleum oil fraction (hydrocarbon oil) such as gasoline, a kerosene or gas oil, or a heavy oil particularly for the purpose of removing a sulfur content contained therein, has catalytic activity reduced to about 60%, or less of initial catalytic activity owing to deposition of a carbonaceous component on the catalyst with use, and hence cannot achieve a target sulfur content concentration after the hydrogenation treatment (for example, 10 ppm or less in the case of gas oil), and is recovered from the hydrogenation treatment step.

[Coke Removal Step]

In the present invention, the reactivation of the used titania catalyst for hydrogenation treatment begins with the coke removal step of removing a carbonaceous component, which is present on the surface of the used catalyst and causes a reduction in the catalytic activity, through combustion, by heating the catalyst at a temperature of 350° C. or more and 600° C. or less, preferably 400° C. or more and 550° C. or less in an oxygen-containing gas atmosphere. In general, it is appropriate to perform calcination treatment under the conditions that the content of the carbonaceous component becomes 3 wt % or less, preferably 2 wt % or less. As the oxygen-containing gas to be used in this step, any gas may be used as long as the gas contains oxygen and allows for the removal of the carbonaceous component on the surface of the used catalyst through combustion. In general, air, an oxygen-containing nitrogen gas, or the like is used. In addition, while the heating temperature varies depending on the kind of the titania support to be used, the following problems may arise: when the heating temperature is less than 350° C., it becomes difficult to completely remove the carbonaceous component on the surface of the used catalyst through combustion; and in contrast, when the heating temperature exceeds 600° C., alternation of the support or aggregation of the catalyst metal to be supported occurs.

[Impregnation Step]

The carbonaceous component-removed catalyst obtained by the coke removal step is then subjected to the impregnation step of impregnating the catalyst with a saccharide-containing solution. A saccharide to be used for this purpose is not particularly limited. Examples thereof include: trioses (glyceraldehyde, dihydroxyacetone, and glycerin), tetroses (such as erythrose, threose, erythrulose, and erythritol), pentoses (such as ribulose, xylulose, ribose, arabinose, xylose, xylitol, lyxose, and deoxyribose), hexoses (suchaspsicose, fructose, sorbose, tagatose, allose, altrose, glucose, mannose, gulose, idose, galactose, talose, fucose, fuculose, rhamnose, sorbitol, mannitol, dulcitol, or galactitol, glucosamine, galactosamine, inositol, and invert sugar), and heptoses (such as sedoheptulose) as monosaccharides; sucrose, lactose, maltose, trehalose, maltitol, turanose, cellobiose, gentiobiose, isomaltose, kojibiose, laminaribiose, melibiose, nigerose, and sophorose as disaccharides; raffinose, melezitose, and maltotriose as trisaccharides; acarbose and stachyose as tetrasaccharides; fructooligosaccharide, galactooligosaccharide, and mannanoligosaccharide as oligosaccharides; glycogen, starch, cellulose, dextrin, glucan, fructan, guar gum, and N-acetylglucosamine as polysaccharides; and isomerized sugar.

From the viewpoint of economic efficiency, it is preferred that the saccharide-containing solution to be used in the impregnating step be a solution such as a water or alcohol solution containing one kind or two or more kinds of saccharides selected from the group consisting of glucose, fructose, erythritol, xylose, xylitol, sorbitol, mannitol, invert sugar, maltose, trehalose, maltitol, isomerized sugar, and raffinose.

In addition, the saccharide concentration in the saccharide-containing solution to be used in the impregnation step is not particularly limited, but needs to be adjusted to a concentration range suitable for the saccharide for the following reasons: when the saccharide concentration is too low, the catalyst cannot be impregnated with a predetermined amount of the saccharide because the catalyst can be impregnated with the solution in an amount just commensurate with the pore volume of the support; and in contrast, when the saccharide concentration is too high, the viscosity of the solution is increased and the solution cannot penetrate the pores of the catalyst sufficiently. The saccharide concentration is generally 5 mass% or more and 60 mass% or less, preferably 10 mass% or more and 50 mass% or less. When the saccharide concentration is less than 5 mass%, there arises a problem in that the catalyst cannot be impregnated with a predetermined amount of the saccharide, and in contrast, when the saccharide concentration exceeds 60 mass%, there may arise a problem of incomplete dissolution of the saccharide.

Further, the usage amount of the saccharide, with which the carbonaceous component-removed catalyst is to be impregnated in the impregnation step through use of the saccharide-containing solution and which is to be supported on the carbonaceous component-removed catalyst through drying in the subsequent drying step, is generally 2 parts by mass or more and 30 parts by mass or less, preferably 5 parts by mass or more and 25 parts by mass or less, with respect to 100 parts by mass of the carbonaceous component-removed catalyst. When the usage amount of the saccharide is less than 2 parts by mass, an effect obtained by adding the saccharide is not remarkably exhibited, and in contrast, when the saccharide is added in excess of 30 parts by mass, an effect obtained by adding the saccharide is not further increased.

In the impregnation step, the carbonaceous component-removed catalyst after impregnated with the saccharide-containing solution is allowed to stand still in that state for a predetermined time period to be aged as required with a view to uniformly and stably supporting the saccharide on the carbonaceous component-removed catalyst. The time period for aging is preferably set to a range of from 10 minutes to 24 hours.

In addition, in the impregnation step, the saccharide-containing solution may contain, in addition to the saccharide, a catalyst component including at least one kind of periodic table group VI metal compound, at least one kind of periodic table group VIII to X metal compound, and at least one kind of phosphorus compound, as required. The addition of such catalyst component compensates for a loss fraction of the catalyst component supported on the titania support of the titania catalyst for hydrogenation treatment before use, which is lost through its use and/or the coke removal treatment in its reactivation. With this, the regenerated titania catalyst for hydrogenation treatment after reactivation can certainly exhibit catalytic activity close to the catalytic activity of the titania catalyst for hydrogenation treatment before use.

In addition, the catalyst component to be added to the saccharide-containing solution is preferably the same catalyst component as the catalyst component supported on the titania support in the titania catalyst for hydrogenation treatment before use. That is, the catalyst component is preferably a catalyst component including at least one kind of periodic table group VI metal compound, at least one kind of periodic table group VIII to X metal compound, and at least one kind of phosphorus compound. The catalyst component more preferably includes the same respective compounds as the periodic table group VI metal compound, the periodic table group VIII to X metal compound, and the phosphorus compound used in the titania catalyst for hydrogenation treatment before use.

Further, the added amount of the catalyst component in the saccharide-containing solution may be any amount as long as the loss fraction of the catalyst component lost through use of the catalyst and/or the coke removal treatment in its reactivation can be compensated. The added amount is preferably such an amount that the total amount of the periodic table group VI metal compound, the periodic table group VIII to X metal compound, and the phosphorus compound in the catalyst component is 5 mass % or less with respect to the catalyst component of the regenerated titania catalyst for hydrogenation treatment after reactivation, in terms of an oxide, for the following reasons: the loss fraction of the catalyst component is empirically about 5 mass % or less; in addition, addition beyond necessity may disadvantageously reduce the catalytic activity owing to association between the original catalyst component and the added one; and further, from an economic viewpoint, the added amount is preferably as low as possible, as long as desired catalytic activity (for example, 70% of that of the titania catalyst for hydrogenation treatment before use) is obtained after the reactivation.

[Drying Step]

The saccharide-impregnated catalyst obtained in the impregnation step through impregnation with the saccharide-containing solution is then dried to allow the saccharide to be stably supported on the carbonaceous component-removed catalyst. Thus, the regenerated titania catalyst for hydrogenation treatment through activation is obtained. The drying conditions in the drying step are preferably as follows: a drying temperature falling within a range of 100° C. or more and 400° C. or less, preferably 110° C. or more and 300° C. or less; and a drying time period falling within a range of 0.5 hour or more and 24 hours or less, preferably 1 hour or more and 12 hours or less. While the drying temperature varies depending on the kind of the titania support to be used, it is easy to imagine that various problems occur during a reaction because of a remaining water content when the drying temperature is less than 100° C. In contrast, when the drying temperature exceeds 400° C., there arises a problem of carbonization of the saccharide.

The regenerated titania catalyst for hydrogenation treatment obtained by the method of the present invention exhibits catalytic activity (desulfurization activity) recovered to a level comparable to that of a new titania catalyst for hydrogenation treatment before use, specifically recovered to a value exceeding at least 70%, preferably exceeding 75%, given that the catalytic activity of a new titania catalyst for hydrogenation treatment before use is taken as 100. The regenerated titania catalyst for hydrogenation treatment can be used again for hydrogenation treatment generally as it is, while depending on the use purpose.

Now, a method of using the regenerated titania catalyst for hydrogenation treatment of the present invention is hereinafter described, taking as an example hydrogenation treatment, in particular desulfurization treatment, of a hydrocarbon oil.

When the regenerated titania catalyst for hydrogenation treatment of the present invention is used to perform desulfurization treatment, it is desired to first perform pre-sulfurization for activating the catalyst metal. The pre-sulfurization is performed by using as a pre-sulfiding agent hydrogen sulfide, carbon disulfide, thiophene, dimethyl disulfide, a hydrocarbon oil containing those compounds, or the like.

The desulfurization treatment is performed after the pre-sulfurization. The treatment conditions of the desulfurization treatment are generally preferably as follows: a reaction temperature falling within a range of from 250 to 450° C.; and a hydrogen partial pressure falling within a range of from 1 to 15 MPa, while the conditions vary depending on the kind of a raw material oil or the purpose.

In addition, the reaction mode of the desulfurization treatment is not particularly limited. Examples of the reaction mode include a fixed-bed mode, a movable-bed mode, an ebullating-bed mode, and a suspension-bed mode, and any of those modes may be adopted. The reaction conditions in the case of adopting the fixed-bed mode are preferably as follows: a liquid hourly space velocity (LHSV) falling within a range of from 0.1 to 5 hr$^{-1}$; and a volume ratio of hydrogen/raw material oil falling within a range of from 50 to 500 Nm$^3$/kl.

Specific examples of the hydrocarbon oil that can be treated by using the regenerated titania catalyst for hydrogenation treatment of the present invention include oils ranging from gasoline, a kerosene oil, a light gas oil, a heavy gas oil, and a light cycle oil to an atmospheric residual oil, a vacuum residual oil, an oil sand oil, and a tar sand oil.

Advantageous Effects of Invention

According to one embodiment of the present invention, it is possible to reactivate the used titania catalyst for hydrogenation treatment exhibiting reduced catalytic activity after having been used for hydrogenation treatment of a hydrocarbon oil, to recover its catalytic activity to a level comparable to that of a fresh titania catalyst before use. Therefore, the obtained regenerated titania catalyst for hydrogenation treatment can be used almost equally to a fresh titania catalyst. Accordingly, the present invention is industrially extremely beneficial, because excellent features of a titania support are utilized and further the shortcoming of "being economically disadvantageous", that is a major problem from an industrial viewpoint, can be overcome.

DESCRIPTION OF EMBODIMENTS

Embodiments of the present invention are hereinafter described in detail on the basis of Examples, Reference Examples, and Comparative Examples. It should be noted that various physical properties, catalyst performance, and the like were measured under the following procedures and conditions in Examples, Reference Examples, and Comparative Examples described below.

[Treatment Before Measurement]

Upon measurement of various physical properties, an object to be measured was preliminarily subjected to calcination treatment under the conditions of 500° C. and 3 hours, and then analyzed.

[Measurement of Pore Distribution and Pore Volume]

The pore distribution and pore volume of a catalyst or a support were measured by mercury porosimetry through pressurization up to a measurement pressure of 414 MPa using AutoPore IV9520 manufactured by SHIMADZU CORPORATION.

[Pore Sharpness Degree]

The "pore sharpness degree" is a numerical value that specifies the uniformity of a pore size. Herein, a pore sharpness degree closer to 100% means that the pore size of a catalyst or a support is more fully uniform. Specifically, a pore size corresponding to 50% cumulative pore volume (median size) is determined, and then, a partial pore volume (PVM) of ones in the pore size range of ±5% of the logarithmic value of the median size is determined. The pore sharpness degree is determined by the following equation based on the partial pore volume (PVM) and the pore volume (PVT). That is, the pore sharpness degree can be calculated by the following equation based on a cumulative pore distribution curve measured by mercury porosimetry.

$$\text{Pore sharpness degree (\%)}=(PVM/PVT)\times 100$$

[Desulfurization Test of Gas Oil]

A hydrodesulfurization test of gas oil for measuring the desulfurization activity of a hydrogenation treatment catalyst was performed as described below.

The hydrodesulfurization test was performed by using a high-pressure fixed-bed flow reactor and loading 15 ml of a catalyst under the conditions of: reaction pressure: 5 MPa; reaction temperature: 340° C.; liquid hourly space velocity: 1.5 h$^{-1}$; and volume ratio of hydrogen/raw material: 250 Nl/l. All the catalysts for hydrogenation treatment subjected to the test were preliminarily subjected to sulfurization treatment (pre-sulfurization) using gas oil having a sulfur concentration adjusted to 2.5% (in terms of mass) through addition of dimethyl disulfide. Straight-run gas oil from the Middle East subjected to the hydrodesulfurization test has the following properties: specific gravity (15/4° C.): 0.849; sulfur content: 1.21 mass %; nitrogen content: 96 ppm; and initial distillation temperature of 228° C., 50% distillation temperature of 293° C., and 90% distillation temperature of 347° C., as distillation properties.

The desulfurization activity of the catalyst for hydrogenation treatment was determined as described below. The rate constant of a desulfurization reaction was determined on the assumption that the desulfurization reaction was a 1.2-order reaction, and an average value of the rate constants of the desulfurization reaction between a reaction time period of from 100 to 144 hours was calculated. Desulfurization activity relative to that of a catalyst for hydrogenation treatment of Reference Example 1 or Reference Example 2 described below was determined and represented as "relative desulfurization activity," given that the average value of the rate constants of the desulfurization reaction in the case of a titania catalyst for hydrogenation treatment, HBT-1, in Reference Example 1 or an alumina catalyst for hydrogenation treatment, ALC-1, in Reference Example 2 was taken as 100.

[Preparation of Titania Catalyst for Hydrogenation Treatment]

<Preparation of Raw Material Solution>

The following solutions were each prepared in the full amount required for the operations described below: solution A obtained by adding 1,030 g of water with respect to 970 g of aluminum chloride hexahydrate; solution B obtained by adding 1,000 g of water with respect to 1,000 g of 28% ammonia water; solution C obtained by adding water to 198 g of a titanium tetrachloride solution having a Ti concentration of 16.6 mass % and a Cl concentration of 32.3 mass %, to give a volume of 1.8 liters (L); solution D obtained by adding water to 231 g of 14% ammonia water, to give a volume of 1.8 L; and solution E obtained by adding 733 g of hydrochloric acid and 13 g of water to 1,520 g of a titanium tetrachloride solution having a Ti concentration of 16.7 mass % and a Cl concentration of 32.6 mass %.

REFERENCE EXAMPLE 1

<Production of Alumina Hydrate Particle>

(a) 14 L of water were loaded in an enamel vessel of 19 L, and heated to 80° C. while being stirred. 850 g of the solution A were added to the enamel vessel and the mixture was maintained for 5 minutes. The solution at this time (hereinafter referred to as "synthetic solution") had a pH of 2.5. Next, the solution B was added to the enamel vessel in such an amount that the pH of the synthetic solution became 7.5, and the mixture was maintained for 5 minutes (first pH swing).

(b) After that, 850 g of the solution A were added thereto to allow the pH of the synthetic solution to 3.0, and the mixture was maintained for 5 minutes. Then, the solution B was added thereto again in such an amount that the pH of the synthetic solution became 7.5, and the mixture was maintained for 5 minutes (second pH swing).

(c) Then, a chlorine ion and an ammonium ion as impurities were removed by washing. Thus, alumina hydrate particles subjected to pH swing twice were obtained.

<Production of Titania-Coated Alumina Support>

122 g of the obtained alumina hydrate particles were collected in terms of an oxide, and well stirred with a mixer while water was added thereto, to provide 8 L of a dispersion. While the dispersion was maintained at 60° C., the solution C was added thereto to adjust the pH to 5.0. Then, the solution C and the solution D each in an amount of 1.8 L were added thereto simultaneously over about 2 hours so that the pH was continuously maintained within a range of 5.0±0.1. Thus, titania-coated alumina hydrate particles were produced. The coating amount of titania in the obtained titania-coated alumina hydrate particles is 31%.

An ammonia ion and a chlorine ion coexisting with the titania-coated alumina hydrate particles thus obtained were removed by washing with water. Filtration was performed to achieve a water content rate allowing for forming. The resultant was formed into a cylindrical shape having a diameter of 1.2 mm through extrusion molding (forming step), followed by drying at 120° C. for 16 hours and further calcination at 500° C. for 3 hours (first drying step). Thus, a titania-coated alumina support was obtained.

The obtained titania-coated alumina support was measured for the specific surface area and the pore distribution, and subjected to X-ray diffraction.

As a result, it was found that the specific surface area was 400 m²/g, the pore volume was 0.57 ml/g, and the pore sharpness degree was 76.5%. In addition, there was detected no titania in an anatase crystal form.

<Production of Titania Catalyst>

34.5 g of molybdenum oxide, 7.7 g of cobalt carbonate in terms of CoO, and 5.0 g of 85% phosphoric acid were added to water, and dissolved through heating while being stirred. Thus, a catalyst component aqueous solution having a total weight adjusted to 100.0 g was obtained. Further, 4.3 g of sorbitol were dissolved in 27.6 g of the obtained catalyst component aqueous solution. Thus, an aqueous solution containing a catalyst component was obtained.

30.0 g of the titania-coated alumina support obtained above were impregnated with the aqueous solution containing a catalyst component, followed by drying at 120° C. for 12 hours. Thus, a titania catalyst for hydrogenation treatment, HBT-1, was obtained.

It was found that the obtained titania catalyst for hydrogenation treatment had a specific surface area of 232 m²/g, a pore volume of 0.36 ml/g, and a pore sharpness degree of 70.2%.

A hydrodesulfurization test of gas oil using the obtained catalyst was performed under the reaction conditions described above. The average value of the rate constants of the desulfurization reaction was taken as 100, and used as a standard for evaluation of the catalytic activity (relative desulfurization activity) of regenerated titania catalysts for hydrogenation treatment (hereinafter referred to as "regenerated catalyst") obtained in Examples 1 to 5 and Comparative Examples 1 to 3 described below.

[Regeneration of Used Titania Catalyst for Hydrogenation Treatment]

[EXAMPLE 1]

The used titania catalyst for hydrogenation treatment HBT-1 recovered after operation in a hydrodesulfurization apparatus for gas oil for about 1 year was washed with a toluene solvent to remove an oil content. Then, the resultant was dried at 120° C. for 10 hours in an air atmosphere to remove the solvent. At this time, the catalyst contained 14.7 wt % of a carbon content and 8.5 wt % of a sulfur content.

The catalyst after the drying treatment was subjected to coke removal treatment (coke removal step) by rotating the catalyst in a rotary calcination furnace with keeping the furnace temperature at 350° C. for 3 hours and then gradually elevating the temperature and keeping the furnace temperature at 500° C. for 3 hours, while allowing a low oxygen concentration gas having an oxygen concentration of 2.0% obtained through dilution of air with nitrogen to flow into the furnace. It was found that the catalyst after the calcination treatment contained 0.87% of a carbon content and 0.62% of a sulfur content. The catalyst after the coke removal treatment was represented as RHBT-1.

30 g of the catalyst RHBT-1 after the coke removal treatment were impregnated with sorbitol by using an aqueous solution containing 22.1 wt % of sorbitol so that the content of sorbitol was 10 wt % with respect to the catalyst. Then, the resultant was dried at 120° C. for 3 hours. Thus, a regenerated catalyst RHBT-2 was obtained.

[EXAMPLE 2]

30 g of the catalyst RHBT-1 after the coke removal treatment were impregnated with sorbitol by using an aqueous solution containing 22.5 wt % of glucose so that the content of glucose was 10 wt % with respect to the catalyst. Then, the resultant was dried at 120° C. for 3 hours. Thus, a regenerated catalyst RHBT-3 was obtained.

[EXAMPLE 3]

30 g of the catalyst RHBT-1 after the coke removal treatment were impregnated with sorbitol by using an aqueous solution containing 12.0 wt % of glucose so that the content of glucose was 5 wt % with respect to the catalyst. Then, the resultant was dried at 120° C. for 3 hours. Thus, a regenerated catalyst RHBT-4 was obtained.

[EXAMPLE 4]

30 g of the catalyst RHBT-1 after the coke removal treatment were impregnated with sorbitol by using an aqueous solution containing 21.9 wt % of sucrose so that the content of sucrose was 10 wt % with respect to the catalyst. Then, the resultant was dried at 120° C. for 3 hours. Thus, a regenerated catalyst RHBT-5 was obtained.

[EXAMPLE 5]

30 g of the catalyst RHBT-1 after the coke removal treatment were impregnated with sorbitol by using an aqueous solution containing 22.4 wt % of maltitol so that the content of maltitol was 10 wt % with respect to the catalyst. Then, the resultant was dried at 120° C. for 3 hours. Thus, a regenerated catalyst RHBT-6 was obtained.

[EXAMPLE 6]

30 g of the catalyst RHBT-1 after the coke removal treatment were impregnated with sorbitol by using an aqueous solution containing 22.4 wt % of sorbitol, and as a catalyst component, 4.5 g of molybdenum oxide in terms of $MoO_3$, 0.8 g of cobalt carbonate in terms of CoO, and 0.7 g of phosphoric acid in terms of $P_2O_5$ so that the content of sorbitol was 10 wt % with respect to the catalyst. Then, the resultant was dried at 120° C. for 3 hours. Thus, a regenerated catalyst RHBT-9 was obtained.

[COMPARATIVE EXAMPLE 1]

The catalyst RHBT-1 after the coke removal treatment obtained in Example 1 was taken as a regenerated catalyst of Comparative Example 1.

[COMPARATIVE EXAMPLE 2]

The catalyst RHBT-1 after the coke removal treatment was impregnated in the same manner as in Example 1 so that the content of citric acid was 5 wt % and the content of polyethylene glycol was 5 wt %. Then, the resultant was dried at 120° C. for 3 hours. Thus, a regenerated catalyst RHBT-7 was obtained.

[COMPARATIVE EXAMPLE 3]

The catalyst RHBT-1 after the coke removal treatment was impregnated in the same manner as in Example 1 so that the content of citric acid was 5 wt % and the content of glucose was 5 wt %. Then, the resultant was dried at 120° C. for 3 hours. Thus, a regenerated catalyst RHBT-8 was obtained.

<Evaluation of Hydrodesulfurization Activity>

For measuring the desulfurization activities of the regenerated catalysts obtained in Examples 1 to 6 and Comparative Examples 1 to 3 as a catalyst for hydrogenation treatment, the hydrodesulfurization test of gas oil described in the above-mentioned [Desulfurization test of gas oil] section was performed. The relative desulfurization activities were summarized in Table 1.

[REFERENCE EXAMPLE 2]

An ammonia ion and a chlorine ion coexisting with the alumina hydrate particles obtained in the <Production of alumina hydrate particle> section in Reference Example 1 were removed by washing with water. Filtration was performed to achieve a water content rate allowing for forming. The resultant was formed into a cylindrical shape having a diameter of 1.2 mm through extrusion molding (forming step), followed by drying at 120° C. for 16 hours and further calcination at 500° C. for 3 hours (first drying step). Thus, an alumina support was obtained.

The obtained alumina support was measured for the specific surface area and the pore distribution, and subjected to X-ray diffraction. As a result, it was found that the specific surface area was 346 $m^2/g$, the pore volume was 0.5 ml/g, and the pore sharpness degree was 65.9%.

<Production of Alumina Catalyst>

34.5 g of molybdenum oxide, 7.7 g of cobalt carbonate in terms of CoO, and 5.0 g of 85% phosphoric acid were added to water, and dissolved through heating while being stirred. Thus, a catalyst component aqueous solution having a total weight adjusted to 100.0 g was obtained. Further, 4.3 g of sorbitol were dissolved in 27.6 g of the obtained catalyst component aqueous solution. Thus, an aqueous solution containing a catalyst component was obtained.

30.0 g of the alumina support obtained above were impregnated with the aqueous solution containing a catalyst component, followed by drying at 120° C. for 12 hours. Thus, an alumina catalyst for hydrogenation treatment, ALC-1, was obtained.

It was found that the obtained alumina catalyst for hydrogenation treatment had a specific surface area of 195 $m^2/g$, a pore volume of 0.35 ml/g, and a pore sharpness degree of 62.4%.

A hydrodesulfurization test of gas oil using the obtained catalyst was performed under the reaction conditions described above. The average value of the rate constants of the desulfurization reaction was taken as 100, and used as a standard for evaluation of the catalytic activities (relative desulfurization activities) of regenerated catalysts obtained in Comparative Examples 4 to 6 described below.

[Regeneration of Used Alumina Catalyst for Hydrogenation Treatment]

[COMPARATIVE EXAMPLE 4]

The used alumina catalyst for hydrogenation treatment ALC-1 recovered after operation in a hydrodesulfurization apparatus for gas oil for about 1 year was washed with a toluene solvent to remove an oil content. Then, the resultant was dried at 120° C. for 10 hours in an air atmosphere to remove the solvent. At this time, the catalyst contained 16.7 wt% of a carbon content and 8.2 wt% of a sulfur content.

The catalyst after the drying treatment was subjected to regeneration treatment by rotating the catalyst in a rotary calcination furnace with keeping the furnace temperature at 350° C. for 3 hours and then gradually elevating the temperature and keeping the furnace temperature at 500° C. for 3 hours, while allowing a low oxygen concentration gas having an oxygen concentration of 2.0% obtained through dilution of air with nitrogen to flow into the furnace. It w-s found that the catalyst after the calcination treatment contained 0.77% of a carbon content and 0.54% of a sulfur content. The regenerated catalyst was represented as RALC-1.

[COMPARATIVE EXAMPLE 5]

30 g of the regenerated catalyst RALC-1 were impregnated with sorbitol by using an aqueous solution containing 22.1 wt % of sorbitol so that the content of sorbitol was 10 wt % with respect to the catalyst. Then, the resultant was dried at 120° C. for 3 hours. Thus, a regenerated catalyst RALC-2 was obtained.

[COMPARATIVE EXAMPLE 6]

30 g of the regenerated catalyst RALC-1 were impregnated with sorbitol by using an aqueous solution containing 22.5 wt % of glucose so that the content of glucose was 10 wt % with respect to the catalyst. Then, the resultant was dried at 120° C. for 3 hours. Thus, a regenerated catalyst RALC-3 was obtained.

<Evaluation of Hydrodesulfurization Activity>

For measuring the desulfurization activities of the regenerated catalysts obtained in Comparative Examples 4 to 6 as a catalyst for hydrogenation treatment, the hydrodesulfurization test of gas oil described in the above-mentioned [Desulfurization test of gas oil] section was performed. The relative desulfurization activities were summarized in Table 2.

TABLE 1

| | Catalyst No. | Additive in impregnation step | | | Relative activity | Kind of support |
| | | Acid | Saccharide or organic additive | Catalyst component | | |
| --- | --- | --- | --- | --- | --- | --- |
| Reference Example 1 | HBT-1 | — | — | — | 100 | Titania-coated |
| Comparative Example 1 | RHBT-1 | None | None | — | 52 | |
| Example 1 | RHBT-2 | None | Sorbitol 10 wt % | — | 91 | |
| Example 2 | RHBT-3 | None | Glucose 10 wt % | — | 98 | |
| Example 3 | RHBT-4 | None | Glucose 5 wt % | — | 77 | |
| Example 4 | RHBT-5 | None | Sucrose 10 wt % | — | 88 | |
| Example 5 | RHBT-6 | None | Maltitol 10 wt % | — | 93 | |
| Example 6 | RHBT-9 | None | Sorbitol 10 wt % | Mo, Co, P | 98 | |
| Comparative Example 2 | RHBT-7 | Citric acid 5 wt % | Polyethylene glycol 5 wt % | — | 61 | |
| Comparative Example 3 | RHBT-8 | Citric acid 5 wt % | Glucose 5 wt % | — | 64 | |

TABLE 2

| | Catalyst No. | Additive in impregnation step | | Relative activity | Kind of support |
| | | Acid | Saccharide or organic additive | | |
| --- | --- | --- | --- | --- | --- |
| Reference Example 2 | ALC-1 | — | — | 100 | Alumina |
| Comparative Example 4 | RALC-1 | None | None | 53 | |
| Comparative Example 5 | RALC-2 | None | Sorbitol 10 wt % | 62 | |
| Comparative Example 6 | RALC-3 | None | Glucose 10 wt % | 64 | |

The invention claimed is:
1. A method of reactivating a used titania catalyst for hydrogenation treatment, the method comprising:
   obtaining a titania-coated alumina support comprising an alumina hydrate particle and a titania coating layer formed on a surface of the alumina hydrate particle between an isoelectric point of aluminum oxide and an isoelectric point of titanium oxide by coating the alumina hydrate particle with the titania coating layer in a condition of 5.0±0.1 of a pH,
   wherein the titania-coated alumina support does not have an anatase crystal form of titania as detected by X-ray diffraction;
   supporting a catalyst component and a saccharide on the titania-coated alumina support to obtain a fresh titania catalyst supported on the titania-coated alumina support;
   conducting hydrogenation treatment of a hydrocarbon oil in the presence of the fresh titania catalyst supported on the titania-coated alumina support, thereby resulting in a used titania catalyst supported on the titania-coated alumina support, and a carbonaceous component deposited on a surface of the used titania catalyst; and then subjecting the used titania catalyst supported on the titania-coated alumina support to a reactivation process, wherein the reactivation process comprises:

a coke removal step of removing the carbonaceous component on the surface of the used catalyst supported on the titania-coated alumina support by heating the catalyst in an oxygen-containing gas atmosphere;

an impregnation step of impregnating the carbonaceous component-removed catalyst obtained by the coke removal step with a saccharide-containing solution in a pH region that a zeta potential of titania is ±0 or less; and a drying step of drying the saccharide-impregnated catalyst obtained by the impregnation step to obtain a catalyst in which a saccharide is supported.

2. The method of reactivating a used titania catalyst for hydrogenation treatment according to claim 1, wherein the catalyst component comprises at least one kind of periodic table group VI metal compound, at least one kind of periodic table group VIII to X metal compound, and at least one kind of phosphorus compound.

3. The method of reactivating a used titania catalyst for hydrogenation treatment according to claim 1, wherein the saccharide-containing solution to be used in the impregnation step comprises a solution containing one kind or two or more kinds of saccharides selected from the group consisting of glucose, fructose, erythritol, xylose, xylitol, sorbitol, mannitol, invert sugar, maltose, trehalose, maltitol, isomerized sugar, and raffinose.

4. The method of reactivating a used titania catalyst for hydrogenation treatment according to claim 1, wherein the saccharide-containing solution to be used in the impregnation step comprises a solution containing, in addition to the saccharide, a catalyst component comprising at least one kind of periodic table group VI metal compound, at least one kind of periodic table group VIII to X metal compound, and at least one kind of phosphorus compound.

5. The method of reactivating a used titania catalyst for hydrogenation treatment according to claim 4, wherein the catalyst component contained in the saccharide-containing solution comprises the same catalyst component as the catalyst component supported on the titania support of the titania catalyst for hydrogenation treatment.

6. The method of reactivating a used titania catalyst for hydrogenation treatment according to claim 4 or 5, wherein a total amount of the periodic table group VI metal compound, the periodic table group VIII to X metal compound, and the phosphorus compound, in the catalyst component contained in the saccharide-containing solution, is 5 mass % or less with respect to a catalyst component of a regenerated titania catalyst for hydrogenation treatment after reactivation, in terms of an oxide.

7. The method of reactivating a used titania catalyst for hydrogenation treatment according to claim 1, wherein the oxygen-containing gas to be used in the coke removal step comprises air.

8. The method of reactivating a used titania catalyst for hydrogenation treatment according to claim 1, wherein the impregnation step of impregnating the carbonaceous component-removed catalyst obtained by the coke removal step with a saccharide-containing solution is in a weakly acidic region of from pH 3 to 7.

* * * * *